H. L. JOHNSON.
WRAPPING MACHINE.
APPLICATION FILED JAN. 2, 1914.
1,195,228.
Patented Aug. 22, 1916.
11 SHEETS—SHEET 7.
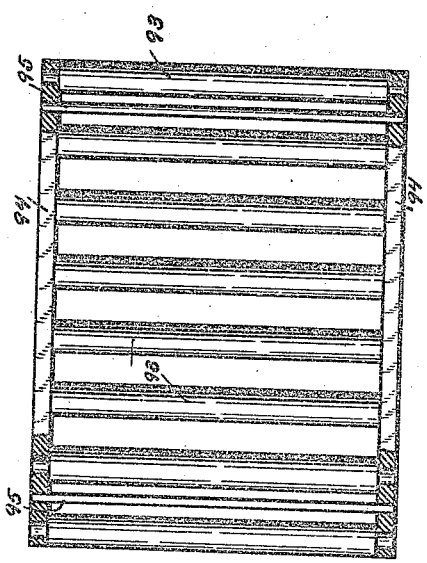
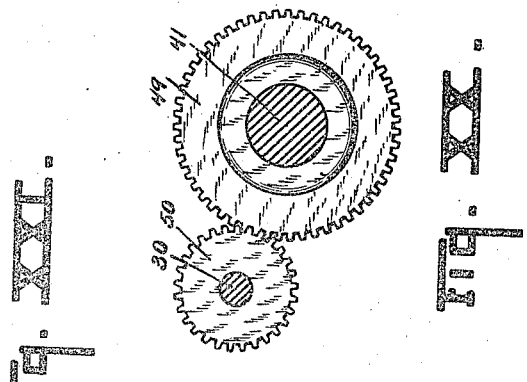
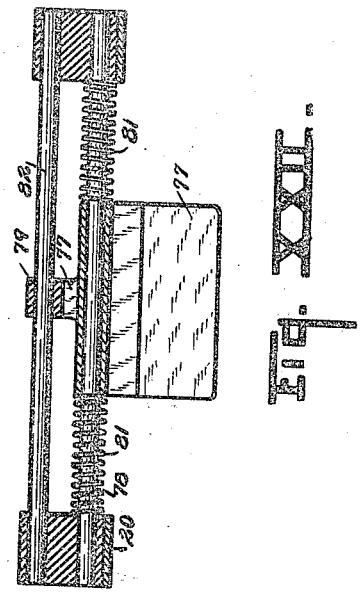
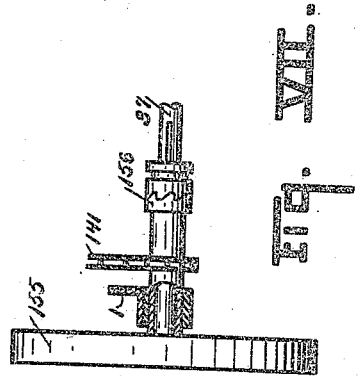
Inventor
Harry L. Johnson
By Chappell & Earl
Attorneys
Witnesses
L. G. Greenfield
D. B. Thompson

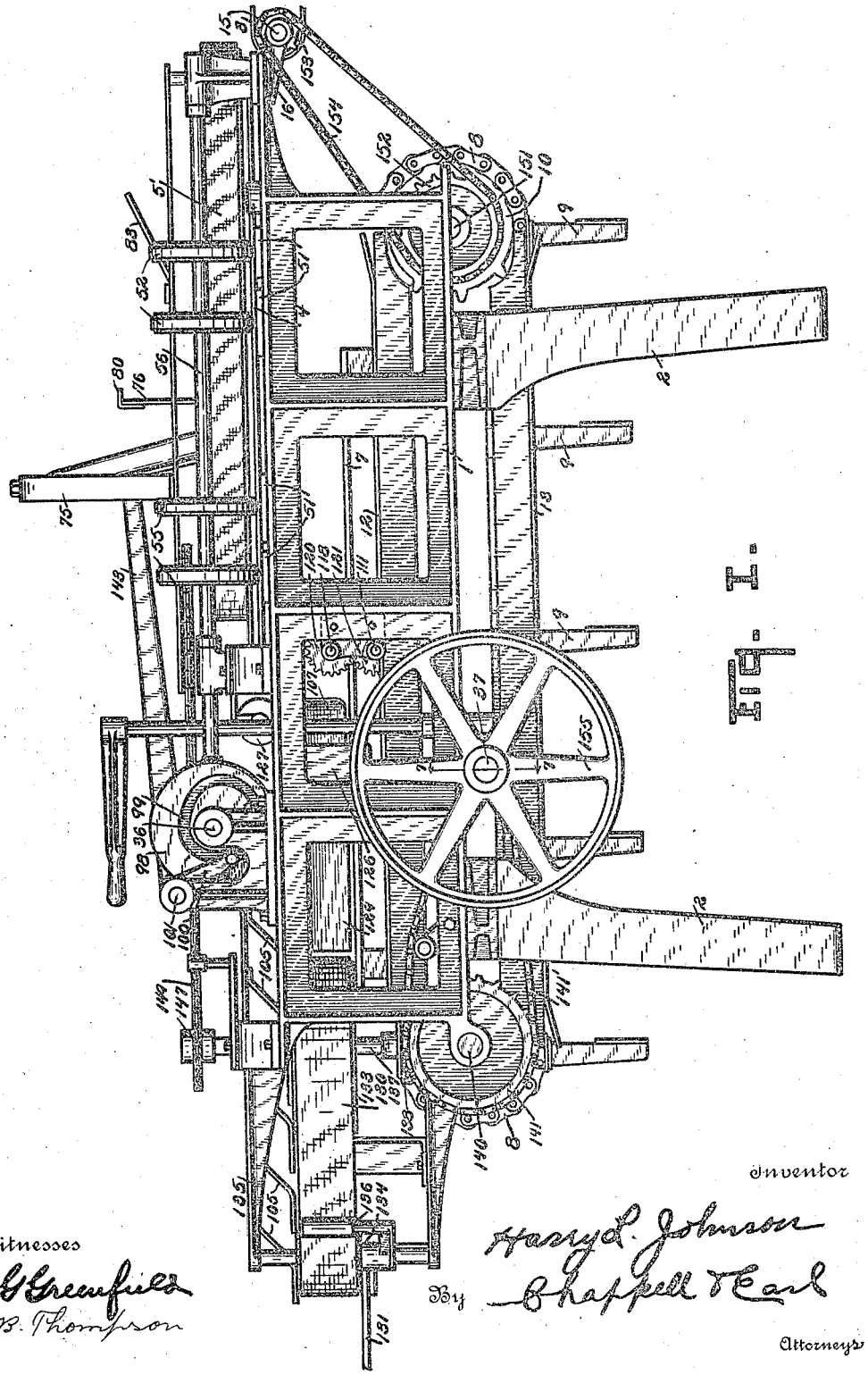

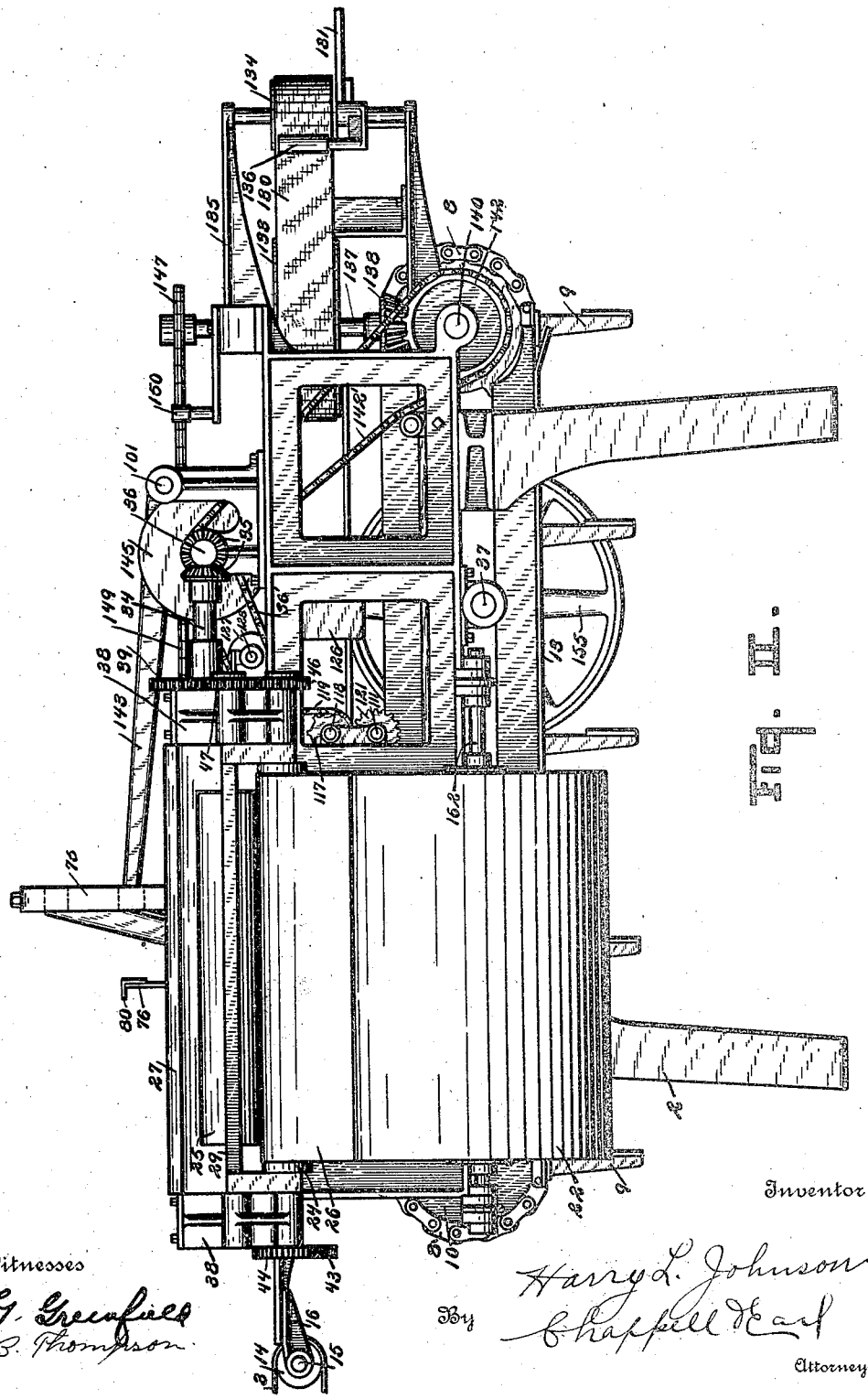

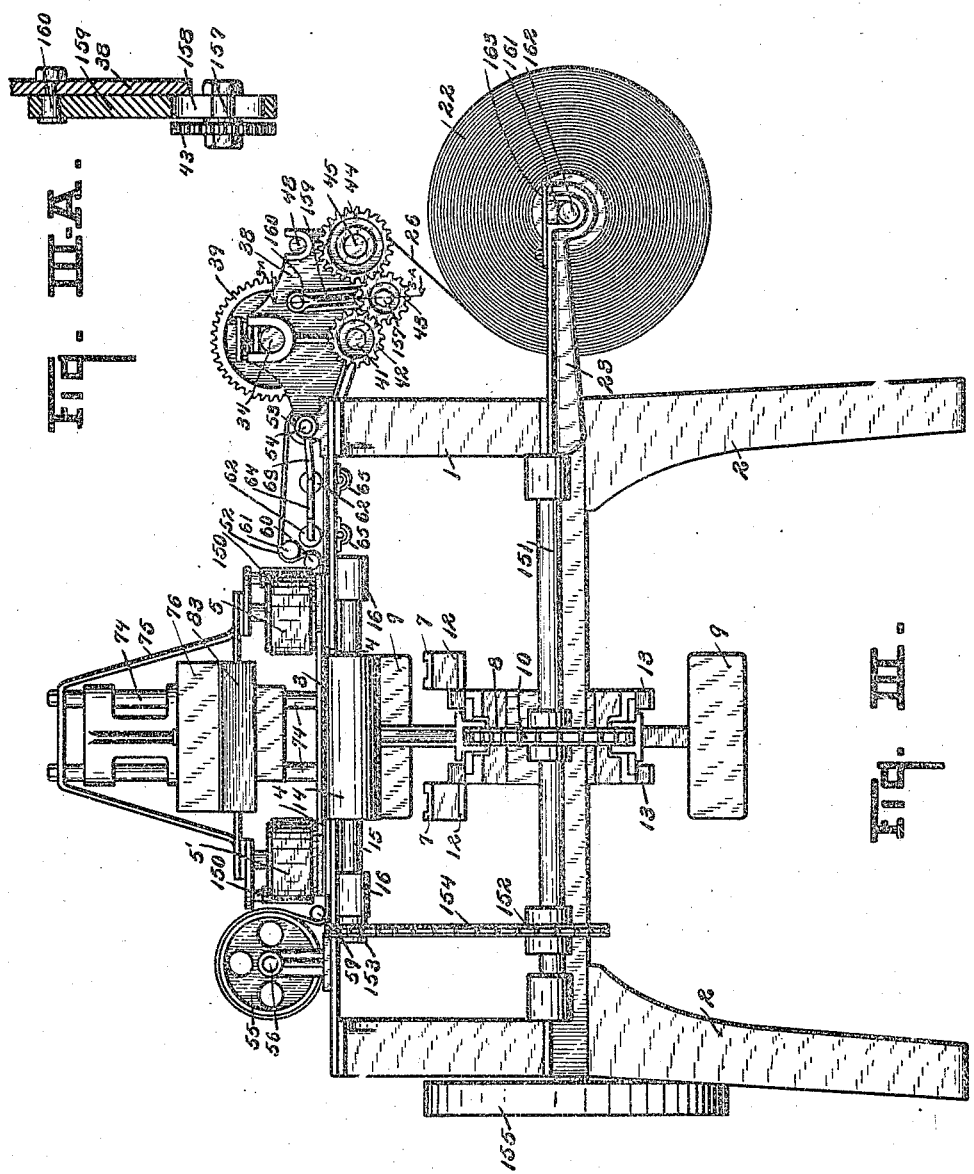

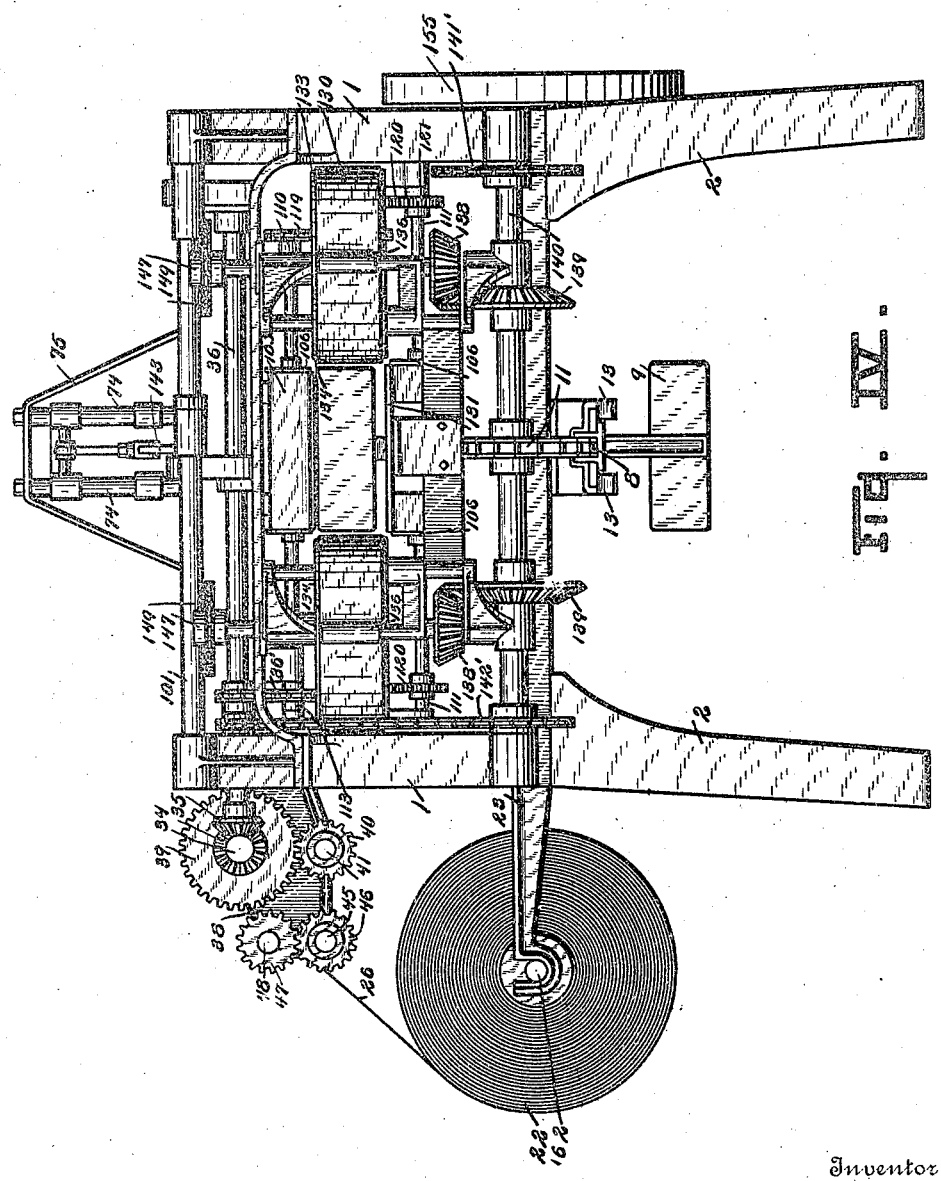

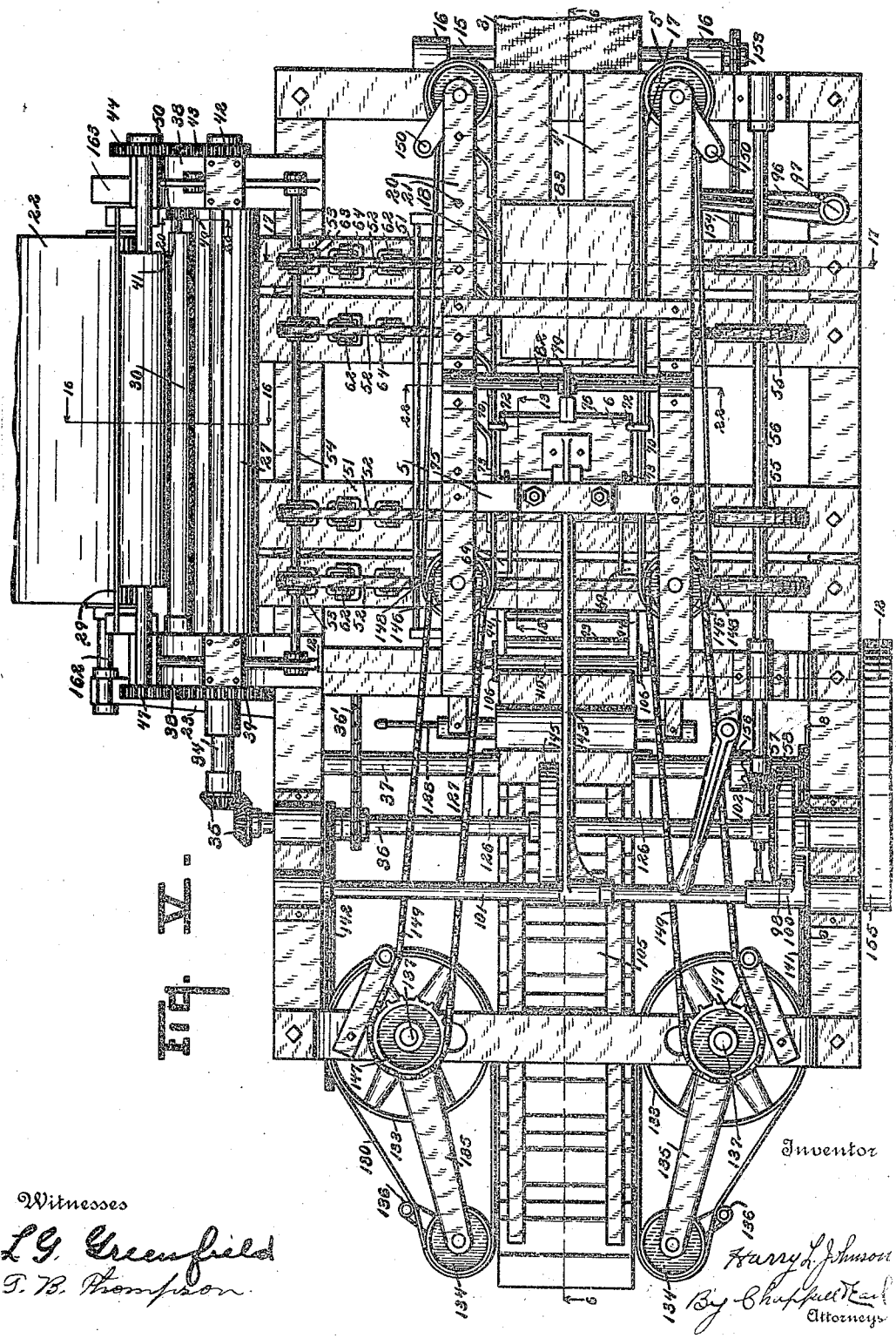

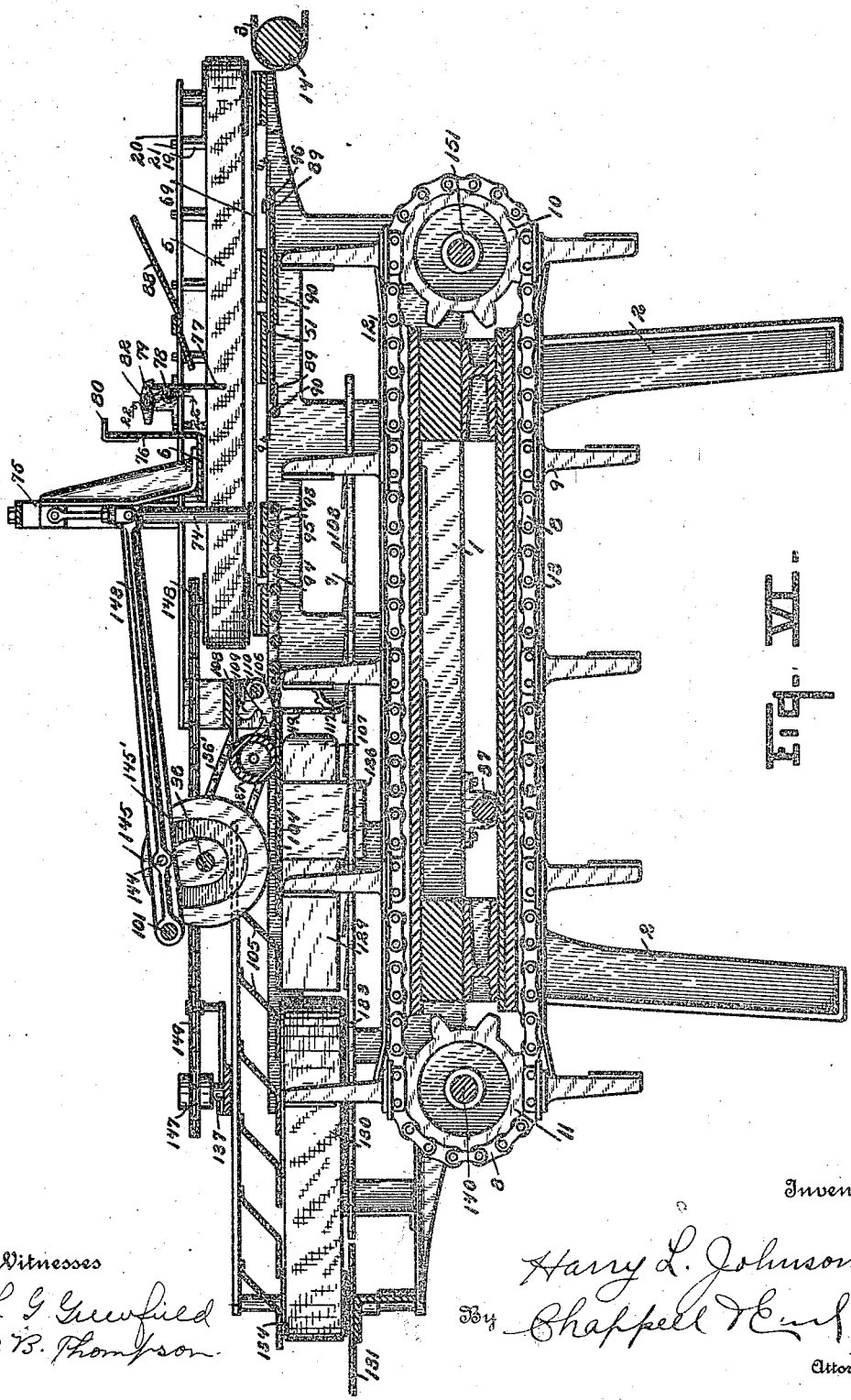

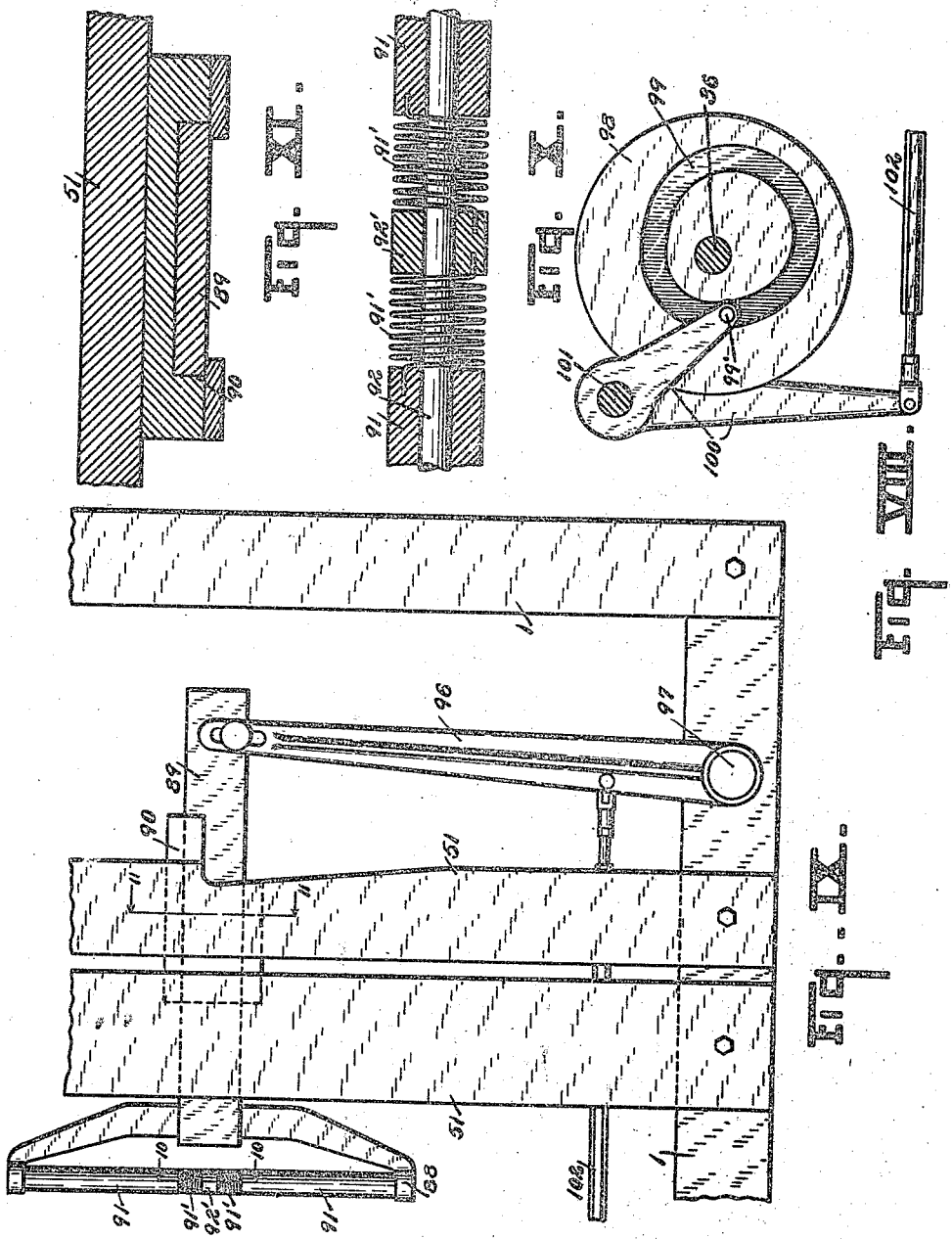

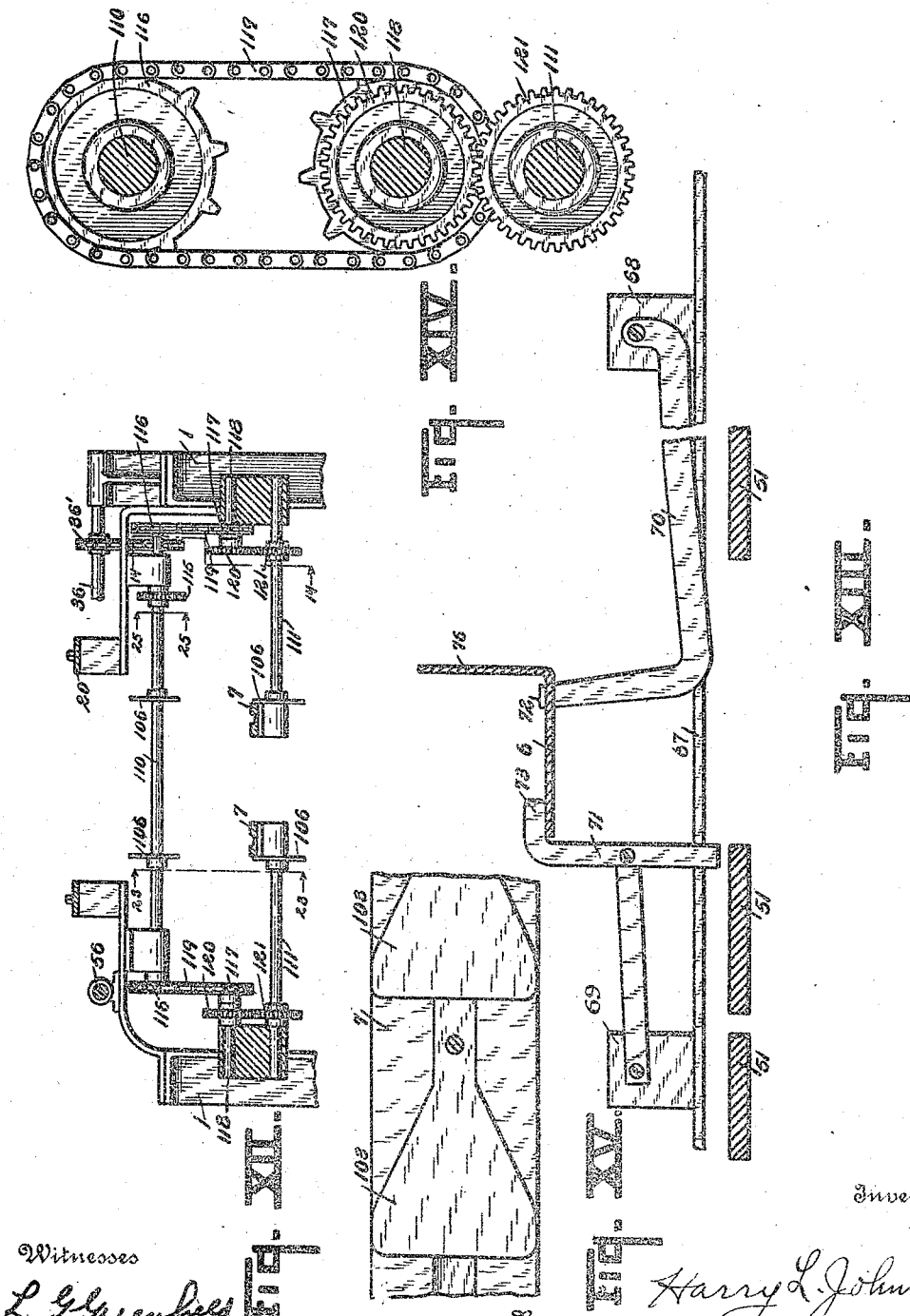

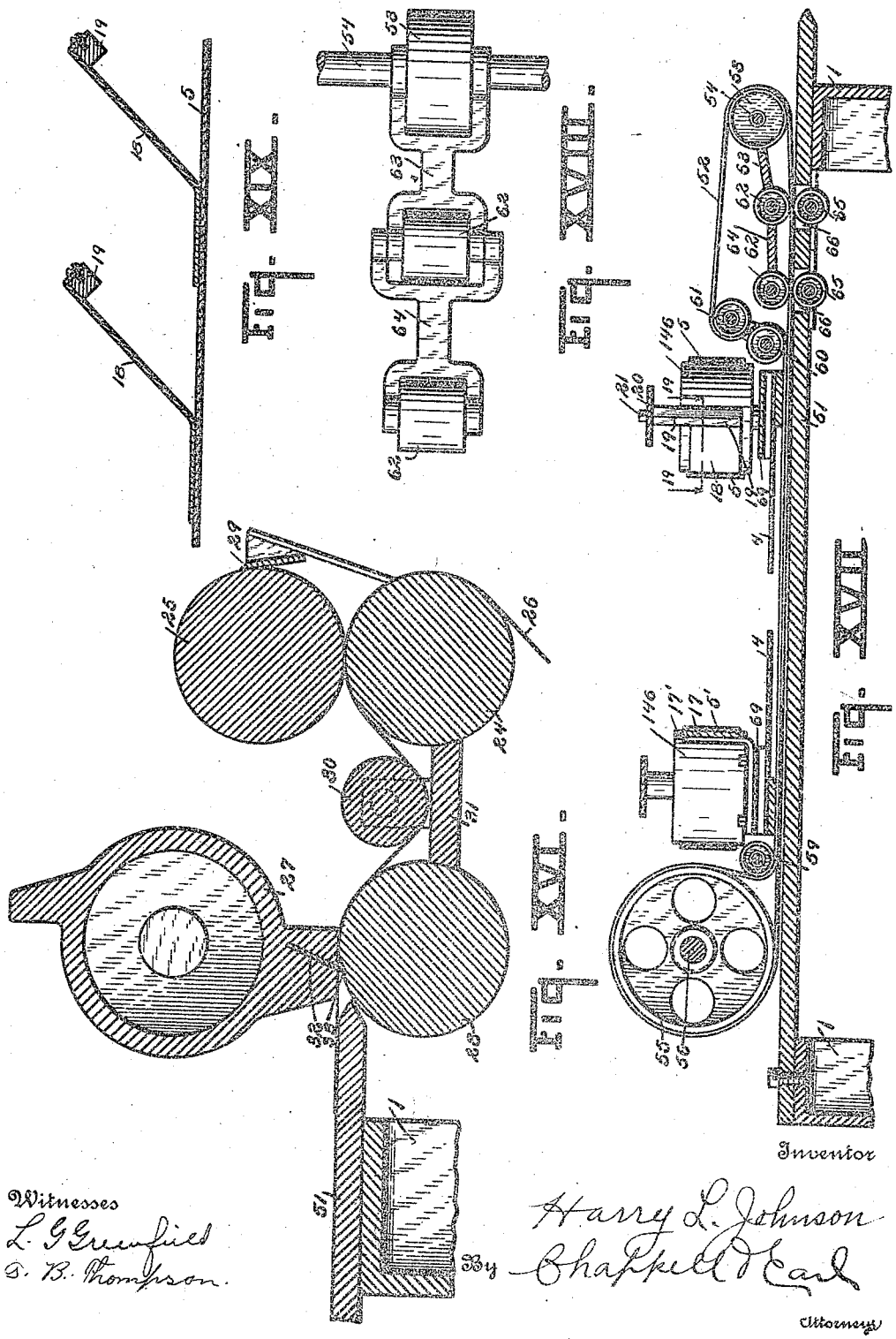

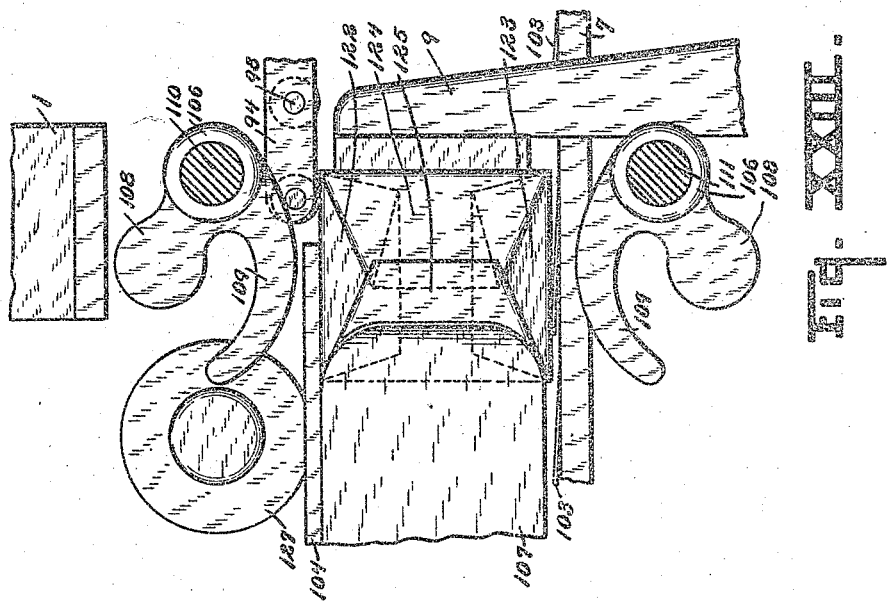
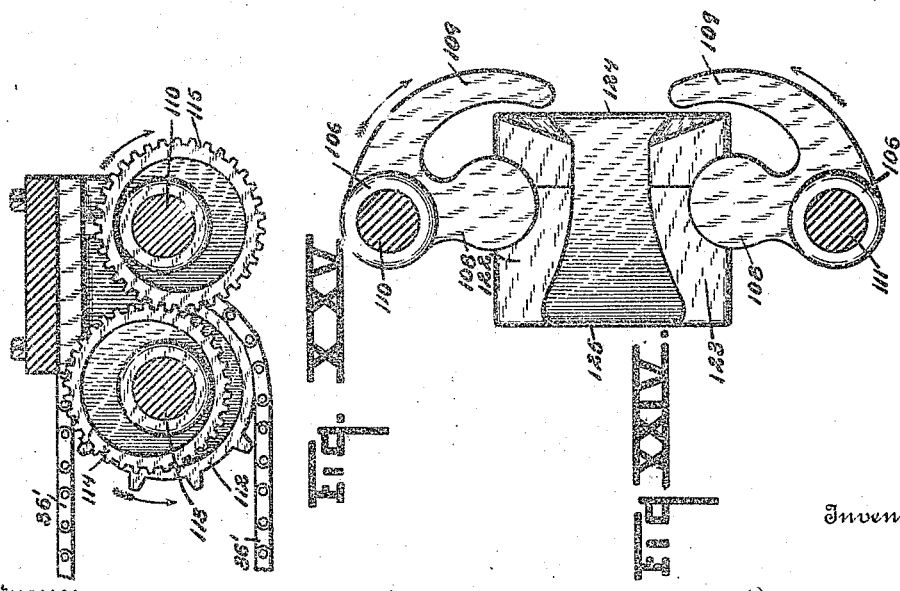

UNITED STATES PATENT OFFICE.

HARRY L. JOHNSON, OF BATTLE CREEK, MICHIGAN, ASSIGNOR TO JOHNSON AUTO-MATIC SEALER CO., LTD., OF BATTLE CREEK, MICHIGAN.

WRAPPING-MACHINE.

1,195,228.

Specification of Letters Patent.

Patented Aug. 22, 1916.

Application filed January 2, 1914. Serial No. 810,005.

*To all whom it may concern:*

Be it known that I, HARRY L. JOHNSON, a citizen of the United States, residing at Battle Creek, Michigan, have invented certain new and useful Improvements in Wrapping-Machines, of which the following is a specification.

This invention relates to improvements in wrapping machines.

My improvements are especially designed by me for wrapping boxes or cartons such as are commonly used for "breakfast" and other prepared foods with paraffined paper, and I have illustrated the same in the accompanying drawings embodied in a machine for that purpose. Various features, however, are desirable for, and readily embodied in machines for wrapping other articles.

The main objects of this invention are: First, to provide an improved automatic wrapping machine. Second, to provide in a wrapping machine an improved means for delivering the article to be wrapped to the paper. Third, to provide an improved means for feeding or delivering the paper to the machine. Fourth, to provide an improved wrapping mechanism. Fifth, to provide an improved wrapping machine which is comparatively simple and compact, and economical in structure, very durable and of large capacity.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure I is a left side elevation of a wrapping machine embodying my invention. Fig. II is a right side elevation of the structure shown in Fig. I. Fig. III is a front end view, the feed belt or conveyer being shown in sections, parts of the wrapping mechanism and the delivery mechanism being omitted. Fig. III^A is a detail vertical section on a line corresponding to line 3^A—3^A of Fig. III. Fig. IV is a rear end elevation. Fig. V is a plan view, the feed conveyer being shown broken away. Fig. VI is a vertical longitudinal section on a line corresponding to line 6—6 of Fig. V. Fig. VII is a detail vertical section on a line corresponding to line 7—7 of Fig. I, showing the driving connections for the main shaft. Fig. VIII is a detail vertical section on a line corresponding to line 8—8 of Fig. V, showing further details of the driving mechanism. Fig. IX is a detail horizontal section on a line corresponding to line 9—9 of Fig. VI, showing details of the wrapping and folding mechanism. Fig. X is a detail section on a line corresponding to line 10—10 of Fig. IX. Fig. XI is a detail section on line 11—11 of Fig. IX. Fig. XII is a detail vertical transverse section showing details of the wrapping mechanism taken on a line corresponding to line 12—12 of Fig. V. Fig. XIII is a detail vertical longitudinal section on a line correspondng to line 13—13 of Fig. V. Fig. XIV is a detail vertical section showing details of the driving connections for the wrapping or folding mechanism on a line corresponding to the broken line 14—14 of Fig. XII. Fig. XV is a detail top view of the conveyer way. Fig. XVI is a detail transverse section on a line corresponding to line 16—16 of Fig. V, showing details of the paper feed mechanism. Fig. XVII is a detail transverse vertical section on a line corresponding to line 17—17 of Fig. V, showing further details of the paper feed mechanism. Fig. XVIII is a detail plan view of one set of the paper feed belt pressure rollers. Fig. XIX is a detail horizontal longitudinal section of one of the carton feed belts taken on a line corresponding to line 19—19 of Fig. XVII. Fig. XX is a detail section on a line corresponding to line 20—20 of Fig. V, showing details of the driving gear of the paper feed mechanism. Fig. XXI is a detail plan of the top retaining rollers and their support. Fig. XXII is a detail transverse section on a line corresponding to line 22—22 of Fig. V, and on the broken line 22—22 of Fig. VI. Fig. XXIII is a detail vertical section on a line corresponding to line 23—23 of Fig. XII, showing further details of the folding or wrapping mechanism. Fig. XXIV is a similar sectional view showing the folder members in another position. Fig. XXV is a detail vertical section on a line corresponding to line 25—25 of Fig. XII, showing further details of the driving means for the folder members.

In the drawings similar reference characters refer to similar parts throughout the several views, and the sectional views are taken looking in the direction of the little arrows at the ends of the section lines.

Referring to the drawings, the main frame 1 comprises suitable side members and cross pieces adapted to support the mechanism. The frame is, in practice, made of iron, so that it is very rigid. It is supported on suitable legs 2.

The articles to be wrapped are carried to the machine by a feed conveyer 3 which delivers the articles on to the plate-like feed ways 4 between the feed belts 5 and 5' arranged at the sides of the feed ways 4. These belts engage the sides of the article and carry it to position to be acted upon by the plunger 6, by which it is delivered to the ways 7 of the wrapping conveyer. The wrapping conveyer, in the structure illustrated, comprises the conveyer chain 8 having flights 9 thereon adapted to travel on their upper reach between the ways 7. The wrapping conveyer is supported by the sprockets 10 and 11 respectively. The wrapping conveyer is provided with upper and lower supports 12 and 13 respectively, but as these form no part of my present invention they are not described with further detail herein.

The rear end of the feed conveyer 3 is supported by the pulley 14, the shaft 15 of which is carried by brackets 16 on the main frame, see Figs. I and V. The inner reach of the feed belt 5' is supported by a plate 17 carried by brackets 17' disposed between the reaches of the belt. The other feed belt 5 is supported by a series of pressure springs 18, which are mounted on the rods 19 disposed between the reaches of the belt and carried by the horizontal bar 20 of the frame. The rods 19 are provided with nuts 21 on their upper ends so that they may be adjusted to regulate the pressure of the springs on the belt, so that it engages the packages or articles with sufficient friction to carry them across the feed ways 4 and below the plunger 6 and to support them above an opening through which they are pushed by the plunger on to the wrapping conveyer ways 7 below, where they are engaged by the flights 9 of the wrapping conveyer and carried to the wrapping and wrapper flap folding mechanism. See Figs. IV, V, VI, XVII and XIX.

The paper is fed into the machine from the roll 22 supported at the side of the machine by the laterally projecting arms 23. Above the roll of paper 22 is a pair of feed rollers 24 and 25 between which the paper 26 passes to the rotary cutter 27, see Figs. III, IV, V and XVI. Disposed below the cutter 27 and coacting therewith is is a roller 28.

As the machine illustrated is adapted for using paraffined paper the feed roller 25 is provided with a scraper 29. In passing to the cutter the strip paper 26 passes under a roller 30, see Fig. XVI. Below this roller 30 is a scraper 31 which acts on the feed roller 24 and also the roller 28. The cutter 27 is provided with a knife 32, while the roller 28 has a longitudinal groove 33 into which the knife strikes to sever the paper. The shaft 34 of the cutter 27, see Figs. IV and V, is connected by the beveled gears 35 to the shaft 36 disposed transversely of the frame and connected to the driving shaft 37, as will be pointed out later.

The shafts of the feed and cutter rollers are mounted on bearing brackets 38 projecting from the upper part of the main frame. The shaft 34 of the cutter is provided with a gear 39 which meshes with a gear 40 on the shaft 41 of the roller 28, see Fig. IV. The shaft 41 is provided with a gear 42 on its opposite end which is connected by the gear 43 to the gear 44 on shaft 45 of the feed roller 26, see Fig. III. When it is desired to change the feed of the paper the gear 43 may be changed to a larger or smaller gear. The journal 157 of the gear 43 is supported in the slot 158 of the hanger arm 159 carried by the pin 160, see Fig. III^A. The rear end of the shaft 45 is provided with a gear 46 meshing with a gear 47 on the shaft 48 of the paper feed roller 25, see Fig. IV. The roller 30 is driven from the shaft 41 of the roller 28 which is provided with a gear 49 on the inside of the supporting bracket 38 which meshes with the gear 50 on the roller 30. See Figs. V and XX.

The paper is delivered from the feed and severing rollers on to the paper feed ways 51, which are disposed transversely of the frame with their front ends close to the cutter. See Figs. V, XVI and XVII. Above these paper feed ways are paper feed belts 52, there being preferably four of the ways 52 and belts as the paper is fed on the ways by the friction of the belts. These paper feed belts 52 are supported at their front ends by pulleys 53 on the shaft 54 arranged longitudinally of the frame. At their rear ends the paper feed belts 52 are supported by pulleys 55 on the shaft 56 arranged longitudinally of the frame and connected by the beveled gears 57 and 58 to the shaft 36. Guide rollers 59, 60 and 61 are provided for these feed belts. The guide rollers 59 and 60 are disposed one at each side of the article feed belts 5 and 5' respectively, so that paper feed belts are guided below the article feed belts and their ways 4. See Fig. XVII. The feed belt guide rollers 61 guide the belts over the friction or pressure rollers 62 disposed at the rear of the front pulleys 60. These pressure rollers cause the belts to effectively engage the paper as it passes to the feed belts from the feed and cutting rollers. These friction applying rollers 62 are journaled on the links 63 and 64, the link 63 being journaled on the shaft 54, while the links 64 are mounted on the journals of the first roller 62. Below these friction applying rollers are supporting rollers 65. The paper feed ways have openings 66 therein through which the rollers engage and support the belts. See Figs. XVII and XVIII. The forward ends of the feed belts are arranged so that the severed sheets are engaged thereby at the time they are severed by the cutters. The paper feed belts effectively engage and carry the severed sheets to position below the plunger 6, the article feed belts carrying the package or article to a position above the paper, as described, so that the plunger pushes the package down on to the paper and the paper is carried with the package on to the wrapping conveyer 7, as stated. The paper roll is provided with a brake or friction block 161 which is held in frictional engagement with the journal 162 of the roll by the spring 163. See Fig. III. The inner pair of paper feed ways 51 are spaced to permit the passage of the article and the plunger which carry with them the paper.

The horizontally disposed pieces 67 have supporting brackets 68 and 69 thereon for the paper retainers 70 and 71. These retainers 70 and 71 are adapted to drop down on the sheet of paper at the beginning of the movement of the plunger so that it is held with some tension, causing it to wrap more closely the bottom and sides of the package or article and holding the edges of the sheet in proper position for the action of the first folding or wrapping members. The members 70 and 71 have offset portions 72 and 73 respectively which are engaged by the plunger 6 so that when the plunger is in its upper position the retaining members 70 and 71 are held in an elevated position to permit the sheet of paper to pass under them. See Fig. XIII. As the plunger begins its downward movement thence retaining members drop on to the sheet so that as the sheet is pushed down with the article it is drawn over the edges of the inner paper feed ways 51 with the retainers 70 and 71 resting thereon. The plunger 6 is mounted for vertical movement on the slide ways 74 supported by the yoke 75. The plunger has a guard plate 76 on its front edge which prevents an article being carried on to the plunger when it is in its lower position. In front of the plunger is a stop 77. This stop is pivotally mounted on the rod 78 above the feed ways so that it successively engages the articles as they are carried along by the feed belts. This stop is provided with a catch 79 which is released by the trip 80 on the guard member 76 of the plunger as the plunger moves on its down stroke. When the stop is released it swings rearwardly to permit the articles to pass. The stop is automatically returned to its engaging position by means of the coiled springs 81 arranged upon the rod 78 to act on the stop. The catch 79 is pivoted on the rod 82. See Figs. VI and XXII. In front of the stop is a forwardly and upwardly projecting guide member 83 which assists in guiding the articles to proper position in the feed belts. See Fig. VI.

The articles and the sheet of paper are delivered to the wrapping conveyer 7 by the plunger, as described. The rear edge of the wrapping sheet is folded forwardly by means of the reciprocating folder 88. See Figs. VI, IX, X and XI. The folder is mounted on a slide 89 reciprocating in a suitable slide bearing 90 mounted on the under side of the forward paper feed ways 51. The folder member is provided with rollers 91 rotatably mounted on the spindle 92, see Figs. IX and X. This folder member folds the rear edges of the sheet forwardly upon the article below the front edge of the sheet, which is folded down upon the rear edge as the article passes under the rollers 93, see Figs. VI and XXI. The rollers 91 are provided with springs 91' which are secured at one end to the rollers and at the other to the block 92'. As the folder member moves on its folding stroke over the paper these springs are placed under tension so that on the return stroke the rollers rotate in the direction in which they are moving, thus reducing the friction of the rollers on the paper. These rollers 93 are supported in bearing members 94 connected by the tie rods 95. The reciprocating folder member 88 is actuated by the arm or lever 96 pivoted on the frame at 97. The arm 96 is actuated by the cam 98 on the shaft 36. The cam 98 has a cam groove 99 acting on a roller 99' on one arm of the two-arm lever 100. The lever 100 is pivoted on the rod 101 extending across the frame, see Figs. V and VIII; the other arm of the lever 100 is connected by the link 102 to the lever 96.

The wrapping conveyer way 7 has a series of springs 103 which are secured at their forward ends to project upwardly and rearwardly to yieldingly support the articles carried along by the flights 9 against the rollers 93 above and against the top retaining and heating plate 104 at the rear thereof, and the retaining springs 105 at the rear of the retaining plate 104, see Figs. VI and XV. As the articles pass from the rollers 93 the top and bottom and rear flap folders 106 act to fold these flaps before the front flaps are engaged by the stationary flap turners 107, see Figs. VI, XII, XXIII and XXIV. The flap turners 106 are provided with blade-like fingers 108 adapted to act on the top or bottom flaps, as the case may be, and with fingers 109 adapted to act on the rear flaps. The flap turners 106 are arranged in pairs at the sides of the wrapping conveyer, the upper pair being mounted on the shaft 110, while the lower pair is mounted on stub shafts 111, see Fig. XII. These shafts are driven from the shaft 36, which is connected by the sprocket chain 36′ to the sprocket wheel 112 on a stub shaft 113. An eccentric gear 114 is connected to the sprocket 112 and this gear meshes with an eccentric gear 115 on the shaft 110 so that the shaft 110 is driven with variable speed. To drive the shafts 111 with the same speed as the shaft 110 and in the opposite direction the shaft 110 is provided with sprockets 116, connected with the sprockets 117 on the stub shafts 118, by means of the sprocket chains 119. Gears 120 are secured to the sprockets 117 and mesh with gears 121 on the shafts 111. The top and bottom folder members are thus driven at the same speeds and in reverse directions. See Figs. XII, XIV, XXIV and XXV.

The folder fingers of the rotary folder members 106 are disposed so that the top and bottom flap folder fingers 108 turn the top and bottom flaps respectively with a wiping movement. The movement of the conveyer and these folders being timed so that the fingers 108 engage the flaps substantially at the rear corners of the package, folding the top and bottom flaps smoothly and firmly against the ends of the packages. The flap turner fingers 108 and 109 are spaced so that the fingers 109 do not engage until the fingers 108 have firmly engaged the top and bottom flaps, designated 122 and 123, and forced them well against the ends of the article. See Fig. XXIV. The rear and front flaps are designated by the numerals 124 and 125 respectively in such figure. The fingers 109 engage the rear flap and fold it forwardly over the top and bottom flaps, see Fig. XXIII. The fingers 109 are carried so that their ends engage the rear flap squarely. As the articles are carried forward the front flaps 125 are engaged by the fixed folder member 107 and folded upon the top and bottom and the rear flaps. The flap folders 107 are extended to the heaters 126. The top heating plate 104 is provided with a heater 127, see Fig. V. The heaters shown are gas heaters, the burners of which are connected to a suitable source of supply by the pipe 128. These heating plates melt the paraffin with which the paper is treated sufficiently to cause it to fuse or adhere where folded together. The sealed packages are carried from the heating plates between the flap retaining plates 129 to the discharge belts 130, which are arranged in opposed relations to carry the wrapped sealed articles on to the discharge table 131, or as may be desired. The top retaining springs 105 serve to retain the joined parts of the wrapper together until the paraffin has had time to cool and set.

The delivery belts 130 are supported by the large pulleys 133 at their front ends and by the pulleys 134 at their rear or outer ends, the outer pulleys being carried by the arms 135. The delivery belts 130 are provided with suitable tighteners 136, see Fig. V. The pulleys 133 are on vertical shafts 137, connected by the beveled gears 138 and 139 to the shaft 140 at the rear end of the machine. The shaft 140 having a sprocket 141 is connected by the sprocket chain 141′ to the driving shaft 37. The shaft 140 having a sprocket 142 is connected by the sprocket chain 142′ on the right hand side of the machine to the driven shaft 36, from which the paper feed and cutter rolls and the rotary folders are driven, as has been described.

The plunger actuating lever 143 is pivoted on the rod 101 and has a roller 144 to be actuated in the cam slot 145′ of the cam 145 on the shaft 36. The pulleys 146 of the feed belts 5 and 5′ are driven from the shafts 137, which are provided with sprockets 147 connected to suitable sprockets on the pulley shafts 148 by the sprocket chains 149, see Fig. V. The feed belts 5 and 5′ are provided with suitable belt tighteners 150. The pulley 14 for the feed conveyer 4 is driven from the shaft 151 of the rear conveyer sprocket 10, the shaft being provided with a sprocket wheel 152 connected to the sprocket wheel 153 on the shaft 15 of the pulley 14 by means of the sprocket chain 154.

The driving shaft 37 is provided with a belt pulley 155 controlled by the clutch 156. By this arrangement of driving connections the several parts are all driven in synchronism.

My improved wrapping machine is comparatively simple and compact in structure and of large capacity. It is automatic in operation and is not likely to get out of order. The wrappers are closely wrapped upon the articles and the wrapper is neatly folded and sealed.

I have shown and described my invention in a machine adapted for the wrapping of so-called breakfast food packages or cartons. My improvements may, however, be readily adapted for use in machines for wrapping various other articles, such as cakes of soap, loaves of bread or similar articles of merchandise.

I have not attempted to illustrate or describe the various modifications or adaptations which I contemplate as I believe the disclosure made will enable those skilled in the art to which this invention relates to embody or adapt the same as conditions may require. I desire, however, to be understood as claiming my improvements specifically in the form illustrated, as well as broadly within the scope of the appended claims.

Certain features of my invention illustrated and described in this application are also shown, described and claimed in my application for Letters Patent filed January 30, 1915, Ser. No. 5257, and certain of the claims originally made herein have been transferred to that case.

Having thus described my invention, what I claim as new and desire to secure by Letters Patent is:

1. In a wrapping machine, the combination of an article feed conveyer comprising a feed way, coacting article feed belts disposed with their rear ends extending beyond the way, there being a delivery opening at the rear end of said way, a supporting plate for the inner reach of one of said feed belts, a series of supporting springs for the inner reach of the other of said feed belts, said springs being mounted on independently adjustable supports, a wrapping conveyer way below said delivery opening, a paper feed way disposed transversely below said feed belts at each side of the said delivery opening, paper feed belts disposed below said article feed belts to carry the paper across said delivery opening, a feed plunger to deliver the articles from said feed belts through said delivery opening carrying the wrapping sheet therewith, said plunger being provided with an upwardly projecting guard plate on its front edge, an article stop disposed in front of said plunger, and a catch for said stop arranged to be released by said plunger.

2. In a wrapping machine, the combination of an article feed conveyer comprising a feed way, coacting article feed belts disposed with their rear ends extending beyond the way, there being a delivery opening at the rear end of said way, a supporting plate for the inner reach of one of said feed belts, a series of supporting springs for the inner reach of the other of said feed belts, said springs being mounted on independently adjustable supports, a wrapping conveyer way below said delivery opening, a paper feed way disposed transversely below said feed belts at each side of the said delivery opening, paper feed belts disposed below said article feed belts to carry the paper across said delivery opening, and a feed plunger adapted to deliver the articles carrying the wrapping sheet therewith.

3. In a wrapping machine, the combination of an article feed conveyer comprising a feed way, coacting article feed belts disposed with their rear ends extending beyond the way, there being a delivery opening at the rear end of said way, a wrapping conveyer way below said delivery opening, a paper feed way disposed transversely below said feed belts at each side of the said delivery opening, paper feed belts disposed below said article feed belts to carry the paper across said delivery opening, a feed plunger adapted to deliver the articles from said feed belts through said delivery opening carrying the wrapping sheet therewith, said plunger being provided with an upwardly projecting guard plate on its front edge, an article stop disposed in front of said plunger, and a catch for said stop arranged to be released by said plunger.

4. In a wrapping machine, the combination of an article feed conveyer comprising a feed way, coacting article feed belts disposed with their rear ends extending beyond the way, there being a delivery opening at the rear end of said way, a wrapping conveyer way below said delivery opening, a paper feed way disposed transversely below said feed belts at each side of the said delivery opening, paper feed belts disposed below said article feed belts to carry the paper across said delivery opening, a feed plunger adapted to deliver the articles from said feed belts through said delivery opening carrying the wrapping sheet therewith.

5. In a wrapping machine, the combination of an article feed conveyer comprising a feed way, coacting article feed belts disposed with their rear ends extending beyond the way, there being a delivery opening at the rear end of said way, a series of supporting springs for the inner reach of one of said belts, a wrapping conveyer way below said delivery opening, means for feeding paper across said opening below said article feed belts, a feed plunger adapted to deliver the articles from said feed belts through said delivery opening carrying the wrapping sheets therewith, an article stop disposed in front of said plunger, and a catch for said stop arranged to be released by said plunger.

6. In a wrapping machine, the combination of an article feed conveyer comprising a feed way, coacting article feed belts disposed with their rear ends extending beyond the way, there being a delivery opening at the rear end of said way, a series of supporting springs for the inner reach of one of said belts, a wrapping conveyer way below said delivery opening, means for feeding paper across said opening below said article feed belts, a feed plunger adapted to deliver the articles from said feed belts through said delivery opening carrying the wrapping sheets therewith.

7. In a wrapping machine, the combination of an article feed conveyer comprising a feed way, coacting article feed belts disposed with their rear ends extending beyond the way, there being a delivery opening at the rear end of said way, a wrapping conveyer way below said delivery opening, means for feeding paper across said opening below said article feed belts, a feed plunger adapted to deliver the articles from said feed belts through said delivery opening carrying the wrapping sheets therewith, an article stop disposed in front of said plunger, and a catch for said stop arranged to be released by said plunger.

8. In a wrapping machine, the combination of an article feed conveyer comprising a feed way, coacting article feed belts disposed with their rear ends extending beyond the way, there being a delivery opening at the rear end of said way, a wrapping conveyer way below said delivery opening, means for feeding paper across said opening below said article feed belts, and a feed plunger adapted to deliver the articles from said feed belts through said delivery opening carrying the wrapping sheets therewith.

9. In a wrapping machine, the combination of coacting article feed belts, a supporting plate for the inner reach of one of said feed belts, a series of supporting springs for the inner reach of the other of said feed belts, a wrapping conveyer way below said article feed belts, means for feeding paper below said feed belts, a feed plunger adapted to carry the articles from said feed belts to said wrapping conveyer, carrying the wrapping sheet therewith, an article stop disposed in front of said plunger, and a catch for said stop arranged to be released by said plunger.

10. In a wrapping machine, the combination of coacting article feed belts, a series of supporting springs for the inner reach of one of said feed belts, a wrapping conveyer way below said article feed belts, means for feeding paper below said feed belts, a feed plunger adapted to carry the articles from said feed belts to said wrapping conveyer, carrying the wrapping sheet therewith, an article stop disposed in front of said plunger, and a catch for said stop arranged to be released by said plunger.

11. In a wrapping machine, the combination of coacting article feed belts, a supporting plate for the inner reach of one of said feed belts, a series of supporting springs for the inner reach of the other of said feed belts, a wrapping conveyer way below said article feed belts, means for feeding paper below said feed belts, a feed plunger adapted to carry the articles from said feed belts to said wrapping conveyer, carrying the wrapping sheet therewith.

12. In a wrapping machine, the combination of a pair of coacting article feed belts adapted to engage the ends of the articles to carry them into the machine, a wrapping conveyer way below said feed belts, means for feeding paper below said article feed belts, a plunger moving between said article feed belts and adapted to deliver the articles from said feed belts to said wrapping conveyer, carrying the wrapping sheets therewith, said plunger being provided with an upwardly projecting guard plate on its front edge.

13. In a wrapping machine, the combination of coacting article feed belts, supporting springs for the inner reach of one of said belts, a wrapping conveyer way below said feed belts, means for feeding paper below said article feed belts, a plunger adapted to deliver the articles from said feed belts to said wrapping conveyer, carrying the wrapping sheets therewith, an article stop disposed in front of said plunger, and a catch for said stop arranged to be released by said plunger.

14. In a wrapping machine, the combination of coating article feed belts, supporting springs for the inner reach of one of said belts, a wrapping conveyer way below said feed belts, means for feeding paper below said article feed belts, a plunger adapted to deliver the articles from said feed belts to said wrapping conveyer, carrying the wrapping sheets therewith.

15. In a wrapping machine, the combination of coacting article feed belts, a wrapping conveyer way below said feed belts, means for feeding paper below said article feed belts, a plunger adapted to deliver the articles from said feed belts to said wrapping conveyer, carrying the wrapping sheets therewith, an article stop disposed in front of said plunger, and a catch for said stop arranged to be released by said plunger.

16. In a wrapping machine, the combination of a pair of coacting article feed belts adapted to engage the ends of the articles to carry them into the machine, a wrapping conveyer way below said feed belts, means for feeding paper below said article feed belts, a plunger moving between said article feed belts and adapted to deliver the articles from said feed belts to said wrapping conveyer, carrying the wrapping sheets therewith.

17. In a wrapping machine, the combination of an article feed conveyer, a wrapping conveyer, a plunger carrying the articles from said feed conveyer to said wrapping conveyer, a paper feed means comprising paper feed ways disposed transversely between said conveyers so that the plunger reciprocates between them, paper feed belts coacting with said paper feed ways to carry the paper below the said article feed conveyer and plunger, and paper retainers pivotally mounted above the paper feed ways to rest upon the paper as it is drawn downwardly over the edges of said paper feed ways by the downward movement of the plunger, said retainers being supported in an elevated position by the plunger while it is in its initial position and being permitted to drop to engaging position upon the initial movement of the plunger.

18. In a wrapping machine, the combination of a reciprocating plunger, a paper feed means comprising paper feed ways disposed so that the plunger reciprocates between them, paper feed belts coacting with said paper feed ways, and paper retainers pivotally mounted above the paper feed ways to rest upon the paper as it is drawn downwardly over the edges of said paper feed ways by the downward movement of the plunger, said retainers being supported in an elevated position by the plunger while it is in its initial position and being permitted to drop to engaging position upon the initial movement of the plunger.

19. In a wrapping machine, the combination of an article feed conveyer, a wrapping conveyer, a plunger carrying the articles from said feed conveyer to said wrapping conveyer, a paper feed means comprising paper feed ways disposed between said conveyers, so that the plunger reciprocates between them, paper retainers supported to rest upon the paper as it is drawn from said paper feed ways on the feed movement of the plunger, said retainers being supported in an elevated position while the plunger is in its initial position and being permitted to engage the paper upon the initial movement of the plunger, a folder member reciprocating horizontally below said paper feed ways to engage the rear side of a sheet delivered from said paper feed ways and fold it forwardly upon the article, said folder member being provided with engaging rollers, coiled springs connected to said rollers so that they are placed under tension by the rotation of the rollers on the folding movement, a side folder engaging the front side of the sheet and folding it down over the rear side as the article is carried along by the wrapping conveyer, and end folders, all coacting for the purpose specified.

20. In a wrapping machine, the combination of an article feed conveyer, a wrapping conveyer, a plunger carrying the articles from said feed conveyer to said wrapping conveyer, a paper feed means comprising paper feed ways disposed between said conveyers, so that the plunger reciprocates betweeen them, paper retainers supported to rest upon the paper as it is drawn from said paper feed ways on the feed movement of the plunger, said retainers being supported in an elevated position while the plunger is in its initial position and being permitted to engage the paper upon the initial movement of the plunger, a folder member reciprocating below said paper feed ways to engage the rear side of a sheet delivered from said paper feed ways and fold it forwardly upon the article, a side folder engaging the front side of the sheet and folding it down over the rear side as the article is carried along by the wrapping conveyer, and end folders, all coacting for the purpose specified.

21. In a wrapping machine, the combination of an article feed conveyer, a wrapping conveyer, a plunger carrying the articles from said feed conveyer to said wrapping conveyer, a paper feed means comprising paper feed ways disposed between said conveyers, so that the plunger reciprocates between them, a folder member reciprocating horizontally below said paper feed ways to engage the rear side of the sheet delivered from said paper feed ways and fold it forwardly upon the articles, said folder member being provided with engaging rollers, coiled springs connected to said rollers so that they are placed under tension by the rotation of the rollers on the folding movement, a side folder engaging the front side of the sheet and folding it down over the rear side as the article is carried along by the wrapping conveyer, and end folders, all coacting for the purpose specified.

22. In a wrapping machine, the combination of a conveyer comprising a way having a series of article supporting springs thereon, a paper feed means, a plunger delivering to said conveyer, the paper being wrapped over the bottom, front and rear sides of the article as it is delivered to said conveyer, a reciprocating rear side folder, a front side folder and retainer comprising a series of rollers adapted to fold the front rearwardly as the article is carried along by the conveyer, rotary end flap folders arranged in oppositely rotating pairs, each folder having a pair of fingers, the front fingers being adapted to engage the top and bottom flaps, the rear fingers being longer than the front and adapted to engage the rear flaps to fold them forwardly upon the top and bottom flaps, front flap folders engaging the front flaps as the articles are carried along by said conveyer, top and end heating plates arranged at the rear of said folders, a series of top retaining springs at the rear of said top heating plate, and retaining plates at the rear of said end heating plates, and delivery belts at the rear of said end retaining plates, there being a delivery table at the rear ends of said belts, the front ends of the belts being extended beyond the rear end of the conveyer way, the top retaining springs being continued over the front end of the delivery table.

23. In a wrapping machine, the combination of a conveyer comprising a way, a paper feed means, a plunger delivering to said conveyer, the paper being wrapped over the bottom, front and rear sides of the article as it is delivered to said conveyer, a reciprocating rear side folder, a front side folder and retainer comprising a series of rollers adapted to fold the front rearwardly as the article is carried along by the conveyer, rotary end flap folders arranged in oppositely rotating pairs, each folder having a pair of fingers, the front fingers being adapted to engage the top and bottom flaps, the rear fingers being longer than the front and adapted to engage the rear flaps to fold them forwardly upon the top and bottom flaps, front flap folders engaging the front flaps to fold them rearwardly upon the top and bottom flaps as the articles are carried along by said conveyer, top and end heating plates arranged at the rear of said folders, a series of top retaining springs at the rear of said top heating plate, end retaining plates at the rear of said end heating plates, and delivery belts at the rear of said end retaining plates, there being a delivery table at the rear ends of said belts, the front ends of the belts being extended beyond the rear end of the conveyer way, the top retaining springs being continued over the front end of the delivery table.

24. In a wrapping machine, the combination of a conveyer comprising a way having a series of article supporting springs thereon, a paper feed means, a plunger delivering to said conveyer, the paper being wrapped over the bottom, front and rear sides of the article as it is delivered to said conveyer, a reciprocating rear side folder, a front side folder and retainer comprising a series of rollers adapted to fold the front rearwardly as the article is carried along by the conveyer, rotary end flap folders arranged in oppositely rotating pairs, each folder having a pair of fingers, the front fingers being adapted to engage the top and bottom flaps and adapted to engage the rear flaps to fold them forwardly upon the top and bottom flaps, front flap folders engaging the front flaps to fold them rearwardly upon the top and bottom flaps as the articles are carried along by said conveyer, and top and end heating plates arranged at the rear of said folders.

25. In a wrapping machine, the combination of a conveyer comprising a way, a paper feed means, a plunger delivering to said conveyer, the paper being wrapped over the bottom, front and rear sides of the article as it is delivered to said conveyer, a reciprocating rear side folder, a front side folder and retainer comprising a series of rollers adapted to fold the front rearwardly as the article is carried along by the conveyer, rotary end flap folders arranged in oppositely rotating pairs, each folder having a pair of fingers, the front fingers being adapted to engage the top and bottom flaps, the rear fingers being longer than the front and adapted to engage the rear flaps to fold them forwardly upon the top and bottom flaps, front flap folders engaging the front flaps to fold them rearwardly upon the top and bottom flaps as the articles are carried along by said conveyer, and top and end heating plates arranged at the rear of said folders.

26. In a wrapping machine, the combination of a conveyer comprising a way having a series of article supporting springs thereon, a paper feed means, a plunger delivering to said conveyer, the paper being wrapped over the bottom, front and rear sides of the article as it is delivered to said conveyer, a reciprocating rear side folder, a front side folder and retainer comprising a series of rollers adapted to fold the front rearwardly as the article is carried along by the conveyer, rotary end flap folders arranged in oppositely rotating pairs each folder having a pair of fingers, the front fingers being adapted to engage the top and bottom flaps, the rear fingers being longer than the front and adapted to engage the rear flaps to fold them forwardly upon the top and bottom flaps, and front flap folders engaging the front flaps to fold them rearwardly upon the top and bottom flaps as the articles are carried along by said conveyer.

27. In a wrapping machine, the combination of a conveyer comprising a way having a series of article supporting springs thereon, a paper feed means, a plunger delivering to said conveyer, the paper being wrapped over the bottom, front and rear sides of the article as it is delivered to said conveyer, a reciprocating rear side folder, a front side folder and retainer comprising a series of rollers adapted to fold the front rearwardly as the article is carried along by the conveyer, end flap folders, top and end heating plates arranged at the rear of said folders, a series of top retaining springs at the rear of said top heating plate, end retaining plates at the rear of said end heating plates, and delivery belts at the rear of said end retaining plates, there being a delivery table at the rear ends of said belts, the front ends of the belts being extended beyond the rear end of the conveyer way, the top retaining springs being continued over the front end of the delivery table.

28. In a wrapping machine, the combination of a conveyer comprising a way having a series of article supporting springs thereon, a paper feed means, an article feed means, folders arranged to fold the paper around the article as it is carried along by the conveyer, heating plates arranged at the rear of said folders, a series of top retaining springs at the rear of said heating plates, end retaining plates at the rear of said heating plates, and delivery belts at the rear of said end retaining plates, the front ends of the belts being extended beyond the rear end of the conveyer way.

29. In a wrapping machine, the combination of a conveyer, a paper feed means, an article feed means, folders arranged to fold the paper around the article as it is carried along by the conveyer, heating plates arranged at the rear of said folders, a series of top retaining springs at the rear of said heating plates, end retaining plates at the rear of said heating plates, and a pair of delivery belts at the rear of said end retaining plates engaging the ends of the wrapped articles.

30. In a wrapping machine, the combination of a conveyer comprising a way, having a series of article supporting springs thereon, a paper feed means, an article feed means, folders arranged to fold the paper around the article as it is carried along by the conveyer heating plates arranged at the rear of said folders, and a series of top retaining springs at the rear of said heating plates.

31. In a wrapping machine, the combination of a conveyer comprising a way having a series of article supporting springs thereon, a paper feed means, an article feed means, folders arranged to fold the paper around the article as it is carried along by the conveyer.

In witness whereof, I have hereunto set my hand and seal in the presence of two witnesses.

HARRY L. JOHNSON. [L. S.]

Witnesses:
  G. H. MURPHY,
  O. O. WILSON.